United States Patent [19]

Herold et al.

[11] 4,355,188

[45] Oct. 19, 1982

[54] METHOD FOR TREATING POLYPROPYLENE ETHER AND POLY-1,2-BUTYLENE ETHER POLYOLS

[75] Inventors: Robert J. Herold; Robert E. Bingham, both of Akron, Ohio

[73] Assignee: The General Tire & Rubber Company, Akron, Ohio

[21] Appl. No.: 305,432

[22] Filed: Sep. 25, 1981

Related U.S. Application Data

[63] Continuation-in-part of Ser. No. 6,197,418, Oct. 16, 1980, abandoned.

[51] Int. Cl.$^3$ ............................................. C07C 41/03
[52] U.S. Cl. .................................. 568/620; 568/608; 568/609; 568/621; 568/623; 568/624; 568/625; 536/120
[58] Field of Search ............... 568/608, 609, 620, 621, 568/623–625; 536/120

[56] References Cited

U.S. PATENT DOCUMENTS

| | | |
|---|---|---|
| 3,299,151 | 1/1967 | Wismer et al. . |
| 3,427,256 | 2/1969 | Milgron . |
| 3,427,334 | 2/1969 | Belner . |
| 3,427,335 | 2/1969 | Herold . |
| 3,803,246 | 4/1974 | Rosenzweig et al. . |
| 3,941,849 | 3/1976 | Herold ........................... 525/507 X |
| 4,029,879 | 6/1977 | Muzzio . |
| 4,122,035 | 10/1978 | Cislo . |
| 4,137,398 | 1/1979 | Muzzio . |

FOREIGN PATENT DOCUMENTS 143083  7/1980  Fed. Rep. of Germany .

*Primary Examiner*—Howard T. Mars

[57] ABSTRACT

Polyetherpolyols containing residues of catalysts of the double metal cyanide complex class are treated with a strong base and ion exchanged or neutralized and filtered to provide a stable polyol with reduced tendency to form allophanates with diisocyanates. Further, the addition of ethylene oxide to the polyol while in contact with the strong base serves to end cap the polyol to provide it with primary hydroxyl groups.

5 Claims, No Drawings

METHOD FOR TREATING POLYPROPYLENE ETHER AND POLY-1,2-BUTYLENE ETHER POLYOLS

This application is a continuation-in-part of U.S. patent application Ser. No. 06/197,418 filed Oct. 16, 1980, now abandoned.

The present invention relates to a method for treating polypropylene ether and poly-1,2-butylene ether polyols containing double metal cyanide complex class catalyst residues to remove said residues from these polyols and additionally to provide such polyols with primary hydroxyl groups.

BACKGROUND OF THE INVENTION

Catalysts of the double-metal cyanide complex class, such as zinc cobalticyanide, are well known. Methods for making these catalysts and of using them to make polyalkylene ethers or oxides by the polymerization of alkylene oxides are disclosed in U.S. Pat. Nos. 3,278,457; 3,278,458 and 3,278,459 and divisions thereof Nos. 3,427,256; 3,427,334 and 3,427,335. Methods for making polyalkyleneether polyols using these double metal cyanide catalysts, also, are known as shown by U.S. Pat. Nos. 3,829,505 and 3,941,849 (a division).

The process of U.S. Pat. No. 3,829,505 desirably produces polyalkyleneether polyols which exhibit higher molecular weights, higher hydroxyl functionality and lower unsaturation at the desired higher functionality and molecular weight levels than polyalkylene ether polyols produced by the use of conventional alkaline catalysts. These polyols, also, can be made with low or high molecular weights and with low or high hydroxyl functionality so that they can be used in the manufacture of flexible to rigid polyurethane foams, rubbers, thermoplastics and thermosets. Polyether polyols made with alkaline catalysts have limiting molecular weights. For example, a feature of the use of the double metal cyanide catalyst is the ability to get high molecular weight polypropylene ether triols in contrast to the limiting value of about 6,000 when alkali catalysts are used. In other words the use of alkali catalysts to produce high molecular weight, hydroxyl terminated, polypropylene ethers results in a substantial loss in hydroxyl functionality, while when using the double metal cyanide catalyst, one is able to obtain near theoretical hydroxyl functionality (i.e. 3, if a triol is used as initiator for the PO polymerization) at even very high molecular weights.

However, it has been found that the double metal cyanide complex catalyst residues present in such polyols after polymerization cause certain undesirable reactions both prior to and during their use in making polyurethane products. For example, it has been found that such polyols, e.g., polypropylene ether polyols, containing the double metal cyanide complex catalyst residues, are less stable during storage and tend to build up volatile impurities at a faster rate than polyols devoid of the catalyst residues. These volatiles may give an odor to the polyol and may be acetaldehyde, acetone, propionaldehyde and/or propylene oxide.

Also, it has been found that such catalyst residues in the polyol catalyze the formation of a significant amount of allophanate groups during reaction of the polyol and the polyisocyanate. The formation of such allophanate groups gives a product which is cross linked or chain branched but less stable to heat and, in the case of prepolymers, gives a product which exhibits increased viscosity. Interestingly, certain zinc and cobalt carboxylates are in many cases catalysts of allophanate formation (I. C. Kogon, J. Org. Chem. 26, 3004 (1961)). Moreover, chain branching may affect viscosities. The allophanates are, apparently, intermolecularly hydrogen bonded (I. C. Kogon, J. Am. Chem. Soc. 79, 2253 (1957)). Allophanates, also, are more highly polar then urethanes.

Additionally, it is well known that it is most desirable to make polyurethanes from polyols containing primary hydroxyl groups. Primary hydroxyl groups react faster than secondary hydroxyl groups. Even when mixtures of ethylene oxide and propylene oxide are copolymerized together using the double metal cyanide complex catalyst, the end groups are principally secondary hydroxyl groups since ethylene oxide reacts faster than propylene oxide. In such copolymerizable mixtures, ethylene oxide is used in a minor molar amount, usually not over about 30 mol %, of the total alkylene oxide monomer mixture to prevent water sensitivity. Primary hydroxyl terminated polyols are desired since polyurethane products can be prepared from primary hydroxyl terminated polyols under less severe conditions than when they are prepared using polyols terminated with secondary hydroxyl groups.

Moreover, it was found that when ethylene oxide was added to a polyetherpolyol such as polypropylene ether polyol made with a double metal cyanide catalyst and containing residues of such catalyst, some addition of ethylene oxide to the polyol did take place. However, the major reaction was the homopolymerization of ethylene oxide. This resulted in a heterogenous mixture of crystalline poly (ethylene ether) polyol and poly (propylene ether) polyol which gave unsatisfactory products on reaction with polyisocyanates.

Accordingly, it is an object of the present invention to provide a method or process for treating polyalkylene ether polyols containing double metal cyanide complex catalyst residues to remove said residues and provide polyalkylene ether polyols with a reduced tendency to form allophanate groups.

Another object of this invention is to provide a method for treating polyalkylene ether polyols containing double metal cyanide complex catalyst residues to remove said catalyst residues and to end cap said polyols with ethylene oxide to provide said polyols with primary hydroxyl end groups.

These and other objects and advantages of the present invention will become more apparent to those skilled in the art from the following detailed description and working examples.

SUMMARY OF THE INVENTION

According to the present invention removal of the double metal cyanide complex catalyst residues is accomplished by treating the catalyst residue contained in the polyols with a strong base, thereby converting it into ionic species which can be removed by ion exchange or by neutralization and filtration. Capping with primary hydroxyl groups is accomplished by adding ethylene oxide during or after the base treatment and prior to ion exchange or neutralization and filtration. This invention, thus, provides a method or process for obtaining polypropylene or polybutylene ether polyols prepared with a double metal cyanide complex catalyst like zinc hexacyanocobaltate which have near theoretical hydroxyl functionality, are essentially free of catalyst residues and are generally stable. It, also, provides a process which, while accomplishing the first objectives, makes it possible to add ethylene oxide to the polyol and give polyether polyols containing high amounts of primary hydroxyl groups. The derived products of this process are also novel since the catalyst-free, ethylene oxide capped products produced in this way have the same unique functional characteristics (almost exclusively hydroxyl terminated and low or no unsaturation) as the parent materials as well as high molecular weights.

DISCUSSION OF DETAILS AND PREFERRED EMBODIMENTS

The polyetherpolyols containing secondary hydroxyl groups to be treated according to the present invention comprise polyalkylene ether polyols made by the polymerization of propylene oxide or 1,2-butylene oxide or mixtures thereof, optionally said propylene oxide or 1,2-butylene oxide or mixture thereof containing a minor molar amount thereof, preferably not over about 30 mol %, of ethylene oxide. The polyols, thus, are basically polypropylene and poly-1,2-butylene ether polyols or mixtures thereof. The polyetherpolyols are made according to the teaching of U.S. Pat. No. 3,829,505, above, using a catalyst of the double metal cyanide complex class, preferably zinc cobalticyanide. As initiators or telogens there may be used ethylene glycol, propylene glycol, diethylene glycol, dipropylene glycol, trimethylol propane, 1,2,6-hexane triol, hexylene glycol, tripropylene oxide adduct of glycerol or hexane triol, phloroglucinol, 4,6,4'-trihydroxy diphenyl dimethyl methane, 1,1,3-tris(4-hydroxy-phenyl) propane, pentaerythritol, pentols, hexols, for example, mannitol, glucose, fructose, sucrose, sorbitol and the like and mixtures thereof. Polymerization may be conducted in bulk or solvent. A solvent may be required when the alkylene oxide and initiator are not miscible or soluble in order to facilitate polymerization and also possibly to reduce unsaturation. Polymerization is conducted to obtain the desired molecular weight.

The sodium or potassium metal or mixture or alloy thereof should be finely divided and should be used as a dispersion in mineral or other inert oil. If sodium or potassium per se are used, the metals should be used under inert or moisture free, or essentially moisture free, conditions to avoid reaction with water. Instead of the metals sodium hydroxide and/or potassium hydroxide can be used or aqueous solutions of sodium hydroxide and/or potassium hydroxide may be used. The sodium and/or potassium metal or hydroxides thereof should be used in an amount sufficient to convert at least a substantial amount of and preferably all of the double metal of the cyanide catalyst residues into ionic species which can be removed. When ethylene oxide is to be added to the polyol to end-cap it, there should additionally be sufficient of the alkali metal present to effect this reaction, e.g., the conversion of a substantial amount of, preferably all of, the secondary hydroxyls of the polyols to primary hydroxyl groups.

The reaction of the alkali metal(s), with the presence of the ethylene oxide, can be conducted in bulk or in solvent or dispersion. Reaction in solvent is preferred for ease of mixing, temperature control and so forth. Examples of suitable solvents or dispersants are methanol (for KOH or NaOH), tetrahydrofuran, toluene and so forth. Additionally, the use of a solvent or dispersant facilitates subsequent removal of the catalyst species or residues and the treating agent from the polyol.

The ethylene oxide is added during or after reaction of the alkali metal with the polyol and double metal cyanide catalyst and before removal of the alkali metal and catalyst residues. Sufficient ethylene oxide is added to convert at least some and preferably all of the secondary hydroxyls of the polyols to primary hydroxyls.

The alkali metal and ethylene oxide are reacted at a time and at a temperature sufficient to effect the conversion of the double metal cyanide catalyst residues to ionic species and to convert at least some of the secondary hydroxyl groups of the polyols to primary hydroxyl groups. Such reactions should be conducted in closed vessels or reactors under inert conditions such as under nitrogen, argon or helium gas and so forth. The reactors should be suitably equipped with heating and cooling means, stirrers, charging and discharging means and so forth.

Removal of the ionic (metallic) species of the double metal cyanide complex catalyst residue and of the sodium and/or potassium treating agent is effected by passing the polyether polyol reaction mixture through a cationic ion exchanger or a cationic ion exchanger and then an anionic ion exchanger. As pointed out above the use of a solvent or dispersing agent with the polyol containing the catalyst residues or ionic species and treating agent facilitates removal of the residues and agent. Resins are generally used as ion exchangers. Ion exchangers vary in type and size. A number of them may be used. Also, the cycle through the ion exchanger(s) may be repeated after regenerating the resin. Ion exchange materials, apparatus and methods are well known. In this connection please see "Encyclopedia Of Chemical Technology," Kirk-Othmer, 2nd Ed., Vol. 11, 1966, Interscience Publishers, a division of John Wiley & Sons, Inc., New York, pages 871 to 899; "Encyclopedia Of Polymer Science And Technology," Vol. 7, 1967, Interscience Publishers, a division of John Wiley & Sons, Inc., New York, pages 692 to 742; "Ion Exchange Technology," Nachod and Schubert, 1956, Academic Press, Inc., New York and "Ion Exchange," Salmon and Hale, 1959, Academic Press, Inc., New York.

Instead of ion exchanging or using an ion exchange system to remove the catalyst residue or ionic species and treating agent, the polyol containing the species and treating agent may be treated with a mineral acid like phosphoric acid or sulfuric acid to neutralize the ionic species from the catalyst residue and the treating agent and to precipitate the same. The precipitate may then be removed by filtration. Sufficient acid should be used to provide a neutral or slightly acidic polyol.

The times and temperatures used during reaction with the Na, K etc. and with the ethylene oxide should be sufficient to obtain the desired reactions without decomposition of the polyol or the formation of deleterious by-products. Sufficient solvent or diluent should be used to provide for solution or dispersion of the reactants, for temperature control and for handling the reaction and final products. Solvents and the like can readily be removed at the end of the treatment by stripping or the polymer may be recovered by precipitation and so forth.

At the end of the treatment steps the resulting polyol mixture is preferably stripped to remove any unreacted monomer, solvent, hydrogen cyanide and so forth.

The polyols produced by the method of the present invention are stable or essentially stable. These polyols may be used in the manufacture of flexible to rigid polyurethane foams. Neutral polyols may react differently than acidic polyols in making foams. To make foams the polyols may be mixed with tolylene diisocyanate, water, silicone surfactant, auxiliary blowing agent if desired, stabilizers, fire retardants, catalysts(s) and so forth. Additionally, the polyetherpolyols may be used to make polyurethane elastomers, coatings and adhesives, for example, for automotive and home use such as in fascia, bumpers, paints and so forth. For more information on polyurethanes please see "Polyethers," Part I, Polyalkylene Oxides and Other Polyethers, Gaylord, Interscience Publishers, a division of John Wiley & Sons, New York, 1963; "Polyurethanes," Chemistry and Technology, Part I, Chemistry, Saunders and Frisch, Interscience Publishers, a division of John Wiley & Sons, New York, 1962 and "Polyurethanes," Chemistry and Technology, Part II, Technology, Saunders and Frisch, Interscience Publishers, a division of John Wiley & Sons, New York, 1964.

The following examples will serve to illustrate the present invention with more particularily to those skilled in the art. In these examples the polyether polyols were treated in closed vessels under an atmosphere of nitrogen.

EXAMPLE I

An experimental triol was prepared according to the process of U.S. Pat. No. 3,829,505 by polymerizing propylene oxide using zinc hexacyanocobaltate-glyme as a catalyst and 1,2,3-tri(2-hydroxy-propoxy) propane, as the telogen to provide a polypropylene ether triol having an average molecular weight of about 3,000 and secondary hydroxyl groups. This polyol was designated as an untreated polyol. A portion of the untreated polyol was then reacted with a small amount of sodium metal dispersion in mineral oil and ethylene oxide, 10–15% by weight on the polyol, and then passed through a cation exchange resin and designated as a treated polyol (catalyst residues removed and containing primary OH groups). To both the treated and untreated polyols there was added a small amount of an amine stabilizer (NAUGARD 445, a substituted diphenylamine antioxidant, Uniroyal Chemical). These stabilized polyols were then compared with a commercial polypropylene ether polyol by gas chromatographic analysis. This involved storage of these polyol samples for various periods of time in partially full containers and subsequent sampling and analysis of the gas phases. The packing in the containers used for this analysis was a porous divinylbenzene cross-linked polystyrene, PORAPAK Q, from Waters Associates. The column was 9 feet long with a 3-foot section of 100–120 mesh packing and a 6-foot section of 80–100 mesh pecking. As shown in Table I, below, the untreated polyol, even though stabilized with an amine antioxidant, developed a much higher impurity level than a commercial polyol. On the other hand, when the untreated polyol was rendered free of catalyst residues, it developed close to equal amounts of impurities as the commercial sample but much less than the untreated polyol.

TABLE I

THE EFFECT OF STORAGE AT 100° C. ON THE IMPURITY CONTENT OF VARIOUS POLYOLS

| Polyol | Time of Storage (hours) | Number[1] of Impurity Peaks | Total Area Under Impurity Peaks | Increase of Area Under Impurity Peaks During Storage |
|---|---|---|---|---|
| Dow CP-3000[2] | 1 | 4 | 60 | |
| (commercial) | 5 | 4 | 118 | 58 |
| Untreated Experimental | 1 | 7 | 70 | |
| (amine stabilized) | 5 | 7 | 1250 | 1180 |
| Treated Experimental | 1 | 2 | 86 | |
| (amine stabilized) | 5 | 3 | 160 | 74 |

[1] Observed by gas chromatographic analysis.
[2] Propylene oxide adduct of glycerol, average molecular weight of about 3000, secondary hydroxyl groups, believed stabilized with a phenolic antioxidant. Dow Chemical Co.

EXAMPLE 2

Polypropylene ether triols were prepared according to the method of U.S. Pat. No. 3,829,505 from propylene oxide using VORANOL CP-260 (propylene oxide adduct of glycerol or 1,2,3-tri(-2-hydroxy-propoxy) propane, Dow Chemical Co.) as the telogen and zinc hexacyanocobaltate-glyme as the catalyst. These polyols had average molecular weights of from about 6,000 to 17,000. A number of these polyols were reacted with a small amount of sodium metal dispersion in mineral oil, or aqueous sodium hydroxide, and ethylene oxide (10–15% by weight on the polyol), passed through a cation exchange resin and designated as treated polyols (no catalyst residues). The others not so treated were designated as untreated polyols (with catalyst residues).

The formation of prepolymers (NCO terminated adducts of these polyols) from these polypropylene ether triols, before and after removal of zinc hexacyanocobaltate catalyst residues, and diphenylmethane-4,4'-diisocyanate (MDI) was studied by means of isocyanate content analysis, infrared spectroscopy and viscosity. It was found that the loss of isocyanate groups per hydroxyl group in the prepolymer preparation was always greater for those prepared with triol containing zinc hexacyanocobaltate catalyst residues. This is shown in Table II, below. For samples from which the cyanide catalyst residues had been removed the average reduction in isocyanate per hydroxyl group was 1.14. On the other hand, for samples containing catalyst residues the average reduction in isocyanate per hydroxyl group was 2.24. As shown in the following equations, the reduction in isocyanate per hydroxyl group is expected to be 1.0 and 2.0 for urethane and allophanate formation, respectively.

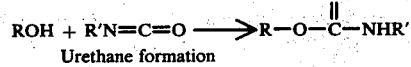
Urethane formation

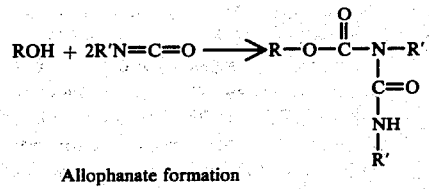
Allophanate formation

TABLE II

Dependence Of Isocyanate Consumption In MDI Prepolymers On The Presence Of Zinc Hexacyanocobaltate Catalyst Residues

CHARGE

| Run | Urethane Catalyst | Initial Hydroxyl Content Of Mixture meq/g | Initial Isocyanate Content Of Mixture meq/g |
|---|---|---|---|
| *Without Catalyst Residues* | | | |
| A | None | 0.169 | 2.97 |
| B | " | 0.180 | 3.20 |
| C | " | 0.187 | 3.20 |
| D | " | 0.187 | 3.20 |
| E | " | 0.204 | 2.75 |
| F | " | 0.234 | 1.97 |
| G | " | 0.363 | 3.20 |
| H | " | 0.407 | 3.20 |
| I | $SnOc_2$ | 0.174 | 3.06 |
| J | " | 0.204 | 2.75 |
| K | " | 0.366 | 3.17 |
| L | " | 0.467 | 3.24 |
| *With Catalyst Residues* | | | |
| M | None | 0.178 | 3.20 |
| N | " | 0.194 | 2.75 |
| O | " | 0.194 | 2.75 |
| P | " | 0.262 | 3.06 |
| Q | $SnOc_2$ | 0.092 | 3.04 |
| R | " | 0.194 | 2.75 |
| S | " | 0.183 | 3.05 |
| T | " | 0.268 | 3.12 |

PRODUCT

| Run | Isocyanate Content meq/g | Eq. Isocyanate Consumed/ Eq. Hydroxyl Charged | |
|---|---|---|---|
| *Without Catalyst Residues* | | | |
| A | 2.83 | 0.83 | |
| B | 2.94 | 1.39 | |
| C | 2.97 | 1.23 | |
| D | 2.98 | 1.18 | |
| E | 2.50 | 1.23 | |
| F | 1.75 | 0.94 | Av. 1.14 ± .14 |
| G | 2.71 | 1.35 | |
| H | 2.75 | 1.11 | |
| I | 2.89 | 0.98 | |
| J | 2.48 | 1.32 | |
| K | 2.79 | 1.04 | |
| L | 2.73 | 1.09 | |
| *With Catalyst Residues* | | | |
| M | 2.88 | 1.80 | |
| N | 2.40 | 1.80 | |
| O | 2.24 | 2.63 | |
| P | 2.42 | 2.45 | Av. 2.24 ± .33 |
| Q | 2.78 | 2.82 | |
| R | 2.34 | 2.12 | |
| S | 2.70 | 1.91 | |
| T | 2.48 | 2.83 | |

$SnOc_2$ = stannous octoate

The infrared data on such samples and on samples of model urethane and allophanate groups are consistent with the idea that the increased loss of isocyanate in samples containing the catalyst residues was due to the formation of allophanate groups. Table III, below, shows the dependence of the ratio of carbonyl infrared absorbance in prepolymers to hydroxyl content of the parent polyol upon the presence of catalyst residues. The average of this ratio was 1.24 and 0.54 for samples with and without catalyst residues, respectively. The ratio of infrared carbonyl absorbances of model allophonate and urethane compounds of otherwise analogous structure was found to be approximately 2.0. Moreover, this is to be expected since there are two carbonyl groups in an allophonate structure and only one in a urethane structure.

TABLE III

Dependence Of Infrared Absorption of MDI Prepolymers On the Presence of Zinc Hexacyanocobaltate Catalysts Residues

| Run | Initial Hydroxyl Content of Charge of Mixture meq/g | Infared Absorbance of 5% $CHCl_3$ Solutions @ 1730 $cm^{-1}$ | Absorbance @ 1730 $cm^{-1}$/Hydroxyl Content | |
|---|---|---|---|---|
| *Without Catalyst Residues* | | | | |
| A | 0.169 | 0.127 | 0.75 | |
| B | 0.180 | 0.085 | 0.46 | |
| C | 0.187 | 0.080 | 0.43 | |
| D | 0.187 | 0.076 | 0.41 | |
| F | 0.234 | 0.099 | 0.42 | |
| G | 0.363 | 0.180 | 0.49 | Av. 0.54 ± .12 |
| H | 0.407 | 0.185 | 0.46 | |
| I | 0.174 | 0.120 | 0.71 | |
| J | 0.204 | 0.160 | 0.80 | |
| K | 0.366 | 0.192 | 0.52 | |
| L | 0.467 | 0.200 | 0.43 | |
| *With Catalyst Residues* | | | | |
| U | 0.089 | 0.087 | 0.98 | |
| M | 0.178 | 0.170 | 0.95 | |
| P | 0.262 | 0.330 | 1.24 | |
| Q | 0.092 | 0.160 | 1.74 | Av. 1.24 ± .19 |
| R | 0.194 | 0.270 | 1.40 | |
| S | 0.183 | 0.220 | 1.20 | |
| T | 0.268 | 0.310 | 1.16 | |

This means that more carbonyl is present in the latter polymers. Additionally, MDI-polypropylene ether triol prepolymers containing catalyst residues exhibited higher viscosities (Poises at 25° C.) as compared to the viscosities of MDI-polypropylene ether triol free of catalyst residues prepolymers when related to the molecular weight of the polypropylene ether triol starting materials. Low viscosity prepolymers are generally preferred for subsequent reaction in making polyurethane elastomers and plastics.

EXAMPLE 3

The following materials were charged to a one-gallon autoclave:

| Materials and Steps | Grams |
|---|---|
| $Zn_3[Co(CN)_6]_2$·glyme catalyst | 0.70 |
| Propylene oxide and | 300 |
| Hexylene glycol | 118 |

Heating was conducted at 74° C. for 4 hours and 50 minutes and resulted in initiation of the reaction as indicated by a pressure drop from 53 to 15 psig.

| | |
|---|---|
| Propylene oxide was added at 84° C. over a 2-hour period. | 857 |
| 30% by weight of Ethylene oxide in tetrahydrofuran was added at 90° C. over a 13-hour period. | 780 |
| Yield of stripped product: Appearance - densely cloudy | 1498 |

A portion of the product was separated into a clear liquid and a solid fraction by solution in hexane and centrifugation.

Yield: Liquid 89%: Solid 11%

Attempts to make useful polyurethane foams from another portion of the product (heterogeneous product) were unsuccessful.

This example shows the unsatisfactory attempt to cap the polyol with ethylene oxide in any effective amount when double metal cyanide complex catalyst residues are present.

EXAMPLE 4

Poly-1,2-butylene ether glycol (hydroxyl number of 47 which, assuming difunctionality (a diol) represents a molecular weight of 2380) containing zinc hexacycanocobaltate catalyst residue (200 ppm Zn) was treated with KOH and NH₄OH and thereafter passed through an ion exchange resin. Analytical data showed that the KOH treatment (A) removed zinc more effectively than did the NH₄OH treatment (B).

|  | Parts By Weight | |
|---|---|---|
| Material | A | B |
| Polyol, g | 400 | 400 |
| Methanol, g | 800 | 800 |
| Water, g | 40 | 40 |
| 10% aqueous KOH, g | 10 | — |
| 10% aqueous NH₄OH, g | — | 10 |
| Treatment Temperature, °C. | 80 | 80 |
| Treatment Time, hours | 2 | 2 |

The treated mixtures were then passed through columns (in series) containing 15 g each of cation and anion exchange resins. Shown below are zinc analyses of each successive 300 g of the final effluent having passed through both resins (including 250 g of methanol as a wash).

|  | Zinc, ppm | |
|---|---|---|
|  | A | B |
| 1 | 0.18 | 41.0 |
| 2 | 0.21 | 43.0 |
| 3 | 2.0 | 48.0 |
| 4 | 8.6 | 40.0 |
| 5 | 16.0* | 9.7# |

*Shows that column was saturated with zinc so that further treatment would not pick up any more zinc ions.
Dilution effect of wash.

EXAMPLE 5

A 10,000 g sample of polypropylene ether triol (made using "VORANOL" CP-260 as a telogen) having an OH content of 0.270 meq/g and containing zinc hexzacyanocobaltate catalyst residue (75 ppm Zn and 33 ppm Co) was treated in 2,000 g. of THF solvent with 50 g of 40% sodium dispersion in mineral oil. Thereafter, it was diluted further with a mixture of 6,650 g of isopropanol and 550 g of water and passed through 2,000 g of "AMBERLYST" A-15 (Rohm and Haas Co.) cation exchange resin. After stripping, the product was found to contain 20 ppm Zn and 12 ppm Co. This example shows removal of catalyst residues without addition of ethylene oxide. The final OH content of the polyol was 0.284 meq/g.

EXAMPLE 6

Polypropylene ether triol (made using "VORANOL" CP-260 as a telogen) containing zinc hexacyanocobaltate catalyst residues (100 ppm Zn, 50 ppm Co). The triol was prepared using the catalyst by reaction of 12,000 g of propylene oxide and 308 g of 1,2,3-trihydroxypropoxypropane. Assuming complete reaction the triol should have had a hydroxyl content of 0.30 meq/g and a molecular weight of 10,000. The triol was mixed with toluene and solid KOH. The slurry was heated at 110° C. while the toluene was stripped off under vacuum. Thereafter, it was stripped 1½ hours more, at 40 mm Hg and 110° C. Ethylene oxide was then added at 93° C. and allowed to react for ⅜ hour. After dilution with tetrahydrofuran, the diluted reaction solution was passed through a cation exchange resin at a rate of one "bed volume" per hour. The amounts of material charged and the analysis of the stripped product are shown below:

| Material | Amount |
|---|---|
| Polyol | 5,000 g |
| Toluene | 10,000 g |
| KOH pellets | 50 g |
| Ethylene oxide | 550 g |
| THF | 12,000 g |
| "AMBERLYST" A-15 | 1,700 ml (wet resin) |
| Product |  |
| Primary hydroxyl, % | 52.3 |
| Zn, ppm | 4 |
| Co, ppm | 1 |

This example shows the great reduction or removal of catalyst residues and the substantial end capping of the polypropylene ether triol. It, also, shows that non aqueous KOH can be used.

EXAMPLE 7

The method of this example was the same as that of Example 6, above, except that the amounts of KOH and of toluene, per 5,000 g of polyol, were varied as shown below and as noted in Table IV below.

| Run | KOH g | Toluene Kg |
|---|---|---|
| AA | 100 | 10 |
| BB | 50 | None |
| CC | 50 | None |
| DD | 100 | 10 |
| EE | 100 | 10 |
| FF | 100 | 10 |
| GG | 50 | 10 |
| HH | 100 | 10 |
| II | 100 | 10 |
| JJ | 100 | 10 |
| KK | 100 | 10 |
| LL | 100 | 10 |
| MM | 50 | 10 |

In this example the catalyst removal process was carried out as per the previous example, Example 6. Rather than determining the zinc and cobalt concentrations, a qualitative test for the presence of potassium was employed as indicator for ion exchange efficiency. When the samples had been efficiently ion exchanged, as indicated by a negative potassium test, it may be assumed that the zinc and cobalt would have been removed as well.

To test for the presence of potassium, the evaporated residue from five drops of the ion exchange column effluent was burned on a platinum wire ring and the flame color was observed through a blue glass. When no violet color could be observed, it was shown that potassium was below one part per million. When higher levels were observed, the solutions were retreated with fresh resin.

The hydroxyl number, KOH treatment temperature, and the rapidity of adding the ethylene oxide were varied as shown in Table IV, below. All the products were clear or only slightly cloudy, indicating relatively efficient capping and no tendency to form homopolyethylene oxide.

TABLE IV

Variation of Primary Capping of Polypropylene Ether Polyols with Hydroxy Number, KOH Treatment Temperature, and Rate of Addition of Ethylene Oxide

| Run | Final polyol OH # | KOH Treatment Temp., °C. | EO Addition Rate | Final polyol % Primary Hydroxyl |
|---|---|---|---|---|
| AA (1) | 19.2 | 200 | Slow | 44.0 |
| BB (1) | 19.8 | 200 | Slow | 41.0 |
| CC (1) | 19.8 | 200 | Slow | 37.0 |
| DD (1) | 19.0 | 200 | Slow | 44.0 |
| EE (2) | 17.5 | 200 | Slow | 47.0 |
| FF (2) | 32.0 | 200 | Slow | 50.0 |
| GG (2) | 17.0 | 230 | Fast | 36.0 |
| HH (2) | 17.0 | 230 | Fast | 45.0 |
| II (2) | 29.0 | 230 | Fast | 51.6 |
| JJ (2) | 29.0 | 230 | Fast | 54.5 |
| KK (2) | 29.0 | 230 | Fast | 51.3 |
| LL (1) | 21.5 | 230 | Slow | 67.0 |
| MM | 29.0 | 230 | Slow | 77.0 |

Although other factors may have been involved, these data suggest that primary capping was higher on high hydroxyl number polyols, when higher temperature treatment of the polyol with KOH was used and with slow ethylene oxide addition rates.

(1) diol—used dipropylene glycol as a telogen.
(2)—used VORANOL CP-260 as a telogen.

EXAMPLE 8

Polypropylene ether diol (using dipropylene glycol as a telogen) was prepared with zinc hexacyanocobaltate-glyme in tetrahydrofuran solution as shown below. Thereafter, sodium metal dispersion in mineral oil was added and allowed to react at 110° C. To this reaction solution, ethylene oxide was added and allowed to react at 66° C. Then, after dilution with a large amount of tetrahydrofuran and a small amount of water, the material was passed through a cation exchange resin to remove the sodium and the catalyst residues. Finally, the capped diol was vacuum stripped of tetrahydrofuran and water. The product was homogeneous and had a high primary hydroxyl content and greatly reduced zinc and cobalt contents.

| Polypropylene Ether Diol Preparation | | |
|---|---|---|
| Dipropyl Glycol | 200 | g |
| Zn$_3$[Co(CN)$_6$]$_2$·ZnCl$_2$·Glyme | 4 | g |
| Tetrahydrofuran | 1,500 | g |
| Propylene Oxide | 1,000 | g |
| Temperature | 77° | C. |
| Time | 1.75 | hours |
| Pressure | 10 | psia |
| Propylene Oxide | 11,000 | g |
| Addition Time | 6.5 | hours |
| Temperature | 77° | C. |
| Additional Reaction Time | 4 | hours |
| Temperature | 93° | C. |
| Analysis of polyol  OH content | .265 | meq/g |
| Zn | 89 | ppm |
| Co | 38 | ppm |
| Reaction of Polyol with Sodium | | |
| Dispersion | | |
| 40% Sodium Metal Dispersion (in mineral oil) | 20 | g |
| Time | 4 | hours |
| Temperature | 110° | C. |
| Capping of Polyol with Ethylene Oxide | | |
| Ethylene Oxide | 1,280 | g (charged all at once) |
| Time | 8 | hours |
| Temperature | 66° | C. |
| Ion Exchange | | |
| THF | 13,300 | g |
| Water | 700 | g |
| Ion Exchange Resin # (32 × 8 CM Column) | 3,000 | ml of wet resin in column |
| Stripping | | |
| Analysis of Final Product: | | |
| OH Content | .258 | meq/g |
| Ethylene Oxide Content (bound) | 2.8 | percent |
| Primary Hydroxyl End Groups | 61.6 | percent |
| Zn | .5 | ppm |
| Co | 1.0 | ppm |

Rohm and Haas AMBERLYST A-15 Cationic

The final product was a homogeneous material.

EXAMPLE 9

Capped polypropylene ether diols (using dipropylene glycol as a telogen) were prepared as in Example 8, above, at two molecular weight levels. More ethylene oxide was charged initially and longer times were allowed for it to react. In one case, this resulted in complete capping as determined by nuclear magnetic resonance analysis.

The conditions for the preparations are shown below:

| Materials and Conditions | Run AAA | Run BBB |
|---|---|---|
| Diol feed stock OH content meq/g | .530 | .330 |
| Preparation | | |
| Original diol, g | 15290 | 14950 |
| Na dispersion in mineral oil, 40%, g | 30 | 30 |
| Reaction Time, hrs. | 18 | 2 |
| Reaction Temp, °C. | 66 | 66 |
| Ethylene Oxide addition, g | 2290 | 2990 |
| Reaction Time, hrs. | 24 | 21 |
| Reaction Temp,. °C. | 66 | 66 |
| THF, g | 13300 | 13300 |
| H$_2$O, g | 700 | 700 |
| Ion Exch. Resin, g. | 2000 | 2000 |
| Rate through resin | ½ bed volume/hr | ½ bed volume/hr |
| Reaction Product Contained % by weight ethylene oxide | 9.5 | 13.0 |

The results obtained are shown in Table V, below:

TABLE V

| Run | Final Hydroxyl Content meq/g | Ethylene Oxide % of Diol Charged | Ethylene Oxide % of Product | Final Primary Hydroxyl % |
|---|---|---|---|---|
| AAA | .481 | 13.0 | 9.5 | 80.4 |
| BBB | .260 | 16.7 | 13.0 | 100.0 |

EXAMPLE 10

The following data shows that the extents of unsaturation as a proportion of the end groups of the treated (Na dispersion-ethylene oxide-ion exchange) polyols are as low as those of the untreated polyols. Please see Examples 6 and 13 of U.S. Pat. No. 3,941,849, above. Moreover, this is shown to be true over a range of molecular weights and for diols as well as a tetrol. The unsaturation of commercial primary capped polyols, also, are shown.

TABLE VI

Unsaturation of polypropylene ether polyols prepared with zinc hexa-cyanocobaltate that have been treated as described herein to remove catalyst and develop primary hydroxyl groups are compared with commercial polyols as shown below:

| Hydroxyl Content meq/g | Functionality, OH groups per Molecule, (approx.) | Molecular Weight | Unsaturation, % of End Groups |
|---|---|---|---|
| .898 | 2 | 2200 | 1.0 |
| .481 | 2 | 4080 | 1.8[1] |
| .260 | 2 | 7430 | 3.3[2] |
| .297 | 4 | 13000 | 2.9 |
| .461 | 3 | 6500 | 15.9[3] |
| .610 | 3 | 4000 | 9.5[4] |

[1] Product referred to as AAA in Example 9, above.
[2] Product referred to as BBB in Example 9, above.
[3] Commercial primary capped polypropylene ether triol, Jefferson Chemical SF 6500.
[4] Commercial primary capped polypropylene ether triol, Union Carbide 4701.
Note: AMBERLYST A-15 fresh resin has a hydrogen ion concentration of about 4.9 meq./gram and a particle size of about 93.3% of from about 16 to 40 mesh and is believed to be a sulfonated cross-linked polystyrene resin.

We claim:

1. The method which comprises treating a polyol selected from the group consisting of polypropylene ether polyol and poly-1,2-butylene ether polyol and mixture of the same, said polyol containing catalyst residues of the double metal cyanide complex class, with a treating agent selected from the group consisting of sodium metal, potassium metal, sodium hydroxide and potassium hydroxide in an amount and at a temperature and for a time sufficient to convert said catalyst residues to ionic species, adding ethylene oxide to said polyol while said polyol is in admixture with said treating agent present in an amount at least sufficient to convert at least some of, preferably all of, the secondary hydroxyl groups of said polyol to primary hydroxyl groups and then removing said ionic species and said treating agent from said polyol, said polyol having been made by polymerizing propylene oxide or 1,2-butylene oxide or mixture of the same with a copolymerizable initiator or telogen consisting essentially of a polyol having from 2 to 8 hydroxyl groups, 2 to 21 carbon atoms and consisting of carbon, hydrogen and oxygen using a polymerization catalyst of the double metal cyanide complex class.

2. The method according to claim 1 wherein the removal of said ionic species and said treating agent is accomplished by treatment of said polyol containing said ionic species and treating agent with a mineral acid to precipitate said species and said treating agent and then filtering said polyol to remove the precipitate formed.

3. The method according to claim 1 wherein the removal of said ionic species and said treating agent is accomplished by passing said polyol containing said ionic species and said treating agent through a cationic ion exchanger.

4. The method according to claim 3 where said polyol is polypropylene ether polyol, said residue is from a zinc hexacyanocobaltate complex catalyst and said treating agent comprises sodium metal dispersion in mineral oil.

5. The method according to claim 3 where said polyol after being passed through said cationic ion exchanger is additionally passed through an anionic ion exchanger.

* * * * *